United States Patent
Yoon

(10) Patent No.: US 10,947,916 B2
(45) Date of Patent: Mar. 16, 2021

(54) CONTROL METHOD OF A VEHICLE HAVING AN EXHAUST GAS RECIRCULATION SYSTEM

(71) Applicants: HYUNDAI MOTOR COMPANY, Seoul (KR); KIA MOTORS CORPORATION, Seoul (KR)

(72) Inventor: Seung Suk Yoon, Anyang-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/503,973

(22) Filed: Jul. 5, 2019

(65) Prior Publication Data
US 2020/0165991 A1 May 28, 2020

(30) Foreign Application Priority Data

Nov. 19, 2018 (KR) .................... 10-2018-0142281

(51) Int. Cl.
| | |
|---|---|
| *F02D 41/00* | (2006.01) |
| *F02M 26/33* | (2016.01) |
| *F02D 41/22* | (2006.01) |
| *F02M 26/47* | (2016.01) |
| *G08B 5/36* | (2006.01) |

(52) U.S. Cl.
CPC ......... *F02D 41/0065* (2013.01); *F02D 41/22* (2013.01); *F02M 26/33* (2016.02); *F02M 26/47* (2016.02); *G08B 5/36* (2013.01); *F02D 2041/0067* (2013.01); *F02D 2041/228* (2013.01); *F02D 2200/0614* (2013.01); *F02D 2200/101* (2013.01)

(58) Field of Classification Search
CPC ...... F02D 41/00; F02D 41/0065; F02D 41/22; F02M 26/33; F02M 26/47; G08B 5/36
USPC ............. 701/108, 109, 112–115; 123/568.12
See application file for complete search history.

(56) References Cited

U.S. PATENT DOCUMENTS

| | | | | |
|---|---|---|---|---|
| 2003/0140614 A1* | 7/2003 | Nearhoof, Sr. | ............ | F02C 9/28 60/39.281 |
| 2009/0127867 A1* | 5/2009 | Yuri | ........................ | F02D 29/06 290/40 R |
| 2013/0312708 A1* | 11/2013 | Kuriyama | ............. | F02D 41/345 123/478 |

(Continued)

*Primary Examiner* — John Kwon
*Assistant Examiner* — Johnny H Hoang
(74) *Attorney, Agent, or Firm* — Lempia Summerfield Katz LLC

(57) ABSTRACT

A control method of a vehicle having an exhaust gas recirculation (EGR) system includes efficiently controlling a temperature of recirculated exhaust gas and, even when the temperature of recirculated exhaust gas excessively increases, damage to hardware, such as an intake manifold or parts of the exhaust gas recirculation system can be prevented. The control method includes: detecting the temperature of exhaust gas recirculated to an engine intake system by the EGR system; entering into a protection mode so as to control the temperature of the recirculated exhaust gas; determining a correction value such that the controller controls the temperature of the recirculated exhaust gas; and correcting an engine control value by using the determined correction value and controlling an engine according to the corrected engine control value.

13 Claims, 3 Drawing Sheets

(56) References Cited

U.S. PATENT DOCUMENTS

2014/0288801 A1* 9/2014 Sasaki ............... F02D 41/0065
                                                         701/102
2015/0198105 A1* 7/2015 Marlett ............... F02M 26/22
                                                         123/568.12
2017/0089284 A1* 3/2017 Miura ................ F02D 41/1447

* cited by examiner

CONTROL METHOD OF A VEHICLE HAVING AN EXHAUST GAS RECIRCULATION SYSTEM

CROSS REFERENCE TO RELATED APPLICATION

The present application claims priority to Korean Patent Application No. 10-2018-0142281, filed Nov. 19, 2018, the entire contents of which are incorporated herein for all purposes by this reference.

BACKGROUND

Field of the Disclosure

The present disclosure generally relates to a control method of a vehicle. More particularly, the present disclosure relates to a control method of a vehicle, wherein a temperature of recirculated exhaust gas can be efficiently controlled by an exhaust gas recirculation system.

Description of the Related Art

Environmental regulation has been intensified recently. Thus, reducing pollutants discharged from a vehicle has become a big issue and has become a primary research and development objective in the global vehicle industry.

Accordingly, various technologies capable of reducing nitrogen oxide (NOx) of exhaust gases of a vehicle have been developed. One such technology is an exhaust gas recirculation (EGR) system.

The EGR system allows some of the exhaust gas discharged from a combustion chamber of an engine to be recirculated to an intake line so as to decrease the highest temperature thereof during burning, thereby restricting the production of nitrogen oxide.

More particularly, the EGR system maintains an air-fuel mixture ratio at a theoretical air-fuel ratio so as to reduce a produced amount of nitrogen oxide without rapidly increasing other harmful substances. The EGR system also supplies some of the exhaust gas to an air/fuel mixture introduced to the combustion chamber so as to reduce an amount of fresh air and decrease flame temperature of combustion gas.

The EGR system includes an EGR pipe connecting an exhaust line and the intake line therebetween. Some of the exhaust gas discharged through an exhaust manifold is recirculated to an intake manifold, an EGR valve provided on the EGR pipe so as to control an amount of recirculated exhaust gas, an EGR cooler allowing the recirculated exhaust gas to be cooled and to be supplied through the EGR valve to the intake line, and an EGR bypass valve selectively bypassing the recirculated exhaust gas through a bypass flow path such that the recirculated exhaust gas does not pass through the EGR cooler.

In the configuration described above, the EGR valve is a valve controlling an amount of the recirculated exhaust gas, i.e., the inlet amount of EGR gas, according to an opening degree amount thereof being controlled. The EGR cooler is a cooler decreasing an EGR gas temperature.

According to the configuration described above, the EGR gas (recirculated exhaust gas) and fresh air are mixed with each other in the intake line of the engine and then supplied through the intake manifold to the combustion chamber of the engine.

In addition, the EGR system may include a boost temperature sensor, which detects the temperature (engine boost temperature) of engine intake air, mixing the EGR gas with fresh air.

Meanwhile, in a diesel engine, a negative pressure valve is used as the EGR bypass valve. However, there is a problem in that, when the EGR bypass valve is stuck open, there is difficulty in malfunction diagnosis, whereby an on-board diagnostics (OBD) warning light is not turned on.

When the EGR bypass valve is stuck open, high-temperature EGR gas passes, not through the EGR cooler, but through the bypass flow path. Accordingly, the EGR gas temperature may rapidly increase and the high-temperature EGR gas bypassing the EGR cooler is supplied to the intake line and the intake manifold of the engine, whereby engine parts may be damaged.

In addition, even when hardware problems such as damage to the EGR valve, a decrease in EGR cooler efficiency, and a malfunction of an air amount sensor occur, the inlet amount of the high-temperature EGR gas may increase.

SUMMARY

Accordingly, the present disclosure is made keeping in mind the above problems occurring in the related art. The present disclosure is intended to propose a control method of a vehicle, wherein a temperature of exhaust gas recirculated by an exhaust gas recirculation (EGR) system can be controlled efficiently.

Furthermore, the present disclosure is intended to propose a control method of a vehicle, wherein, even when the temperature of recirculated exhaust gas excessively increases, damage to hardware, such as an intake manifold or the exhaust gas recirculation system, can be prevented.

In order to achieve the above object, according to one aspect of the present disclosure, a control method of a vehicle having an EGR system is provided. The control method includes: detecting, by a temperature sensor, a temperature of exhaust gas (EGR gas) recirculated to an engine intake system by the EGR system; entering into a protection mode so as to control the temperature of the EGR gas when the temperature of the EGR gas is higher than a first reference temperature when a controller compares the temperature of the EGR gas detected by the temperature sensor with the first reference temperature; determining a correction value such that the controller controls the temperature of the EGR gas by using engine operation information in the entering into the protection mode; and correcting an engine control value by using the determined correction value and controlling an engine according to the corrected engine control value.

Accordingly, the control method of a vehicle according to the present disclosure can efficiently control the temperature of the EGR gas and can efficiently prevent damage of engine parts due to an excessive increase in the EGR gas temperature.

BRIEF DESCRIPTION OF THE DRAWINGS

The above and other objects, features, and other advantages of the present disclosure will be more clearly understood from the following detailed description when taken in conjunction with the accompanying drawings, in which.

DETAILED DESCRIPTION

Hereinbelow, an embodiment of the present disclosure is described in detail with reference to the accompanying drawings such that those of ordinary skill in the art can efficiently perform the embodiment of the present disclosure. However, the present disclosure is not limited to the embodiment and may be variously realized through alternative embodiments.

The statement that a part "includes" an element specifies throughout the specification that the part may further include, unless otherwise stated, other elements while not excluding other elements.

Figure 1:
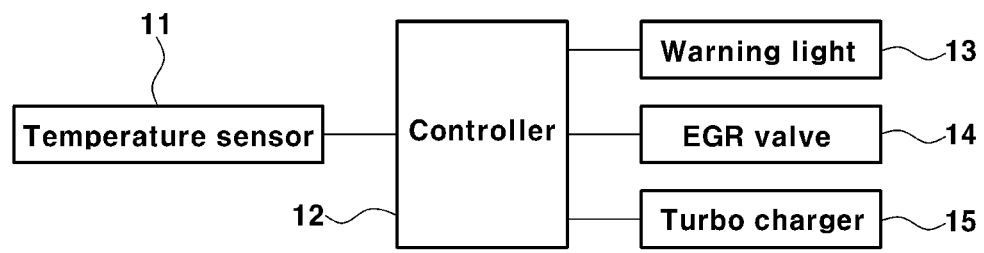
FIG. 1 is a block diagram showing a configuration of a system performing a control process according to an embodiment of the present disclosure.
Figure 2:
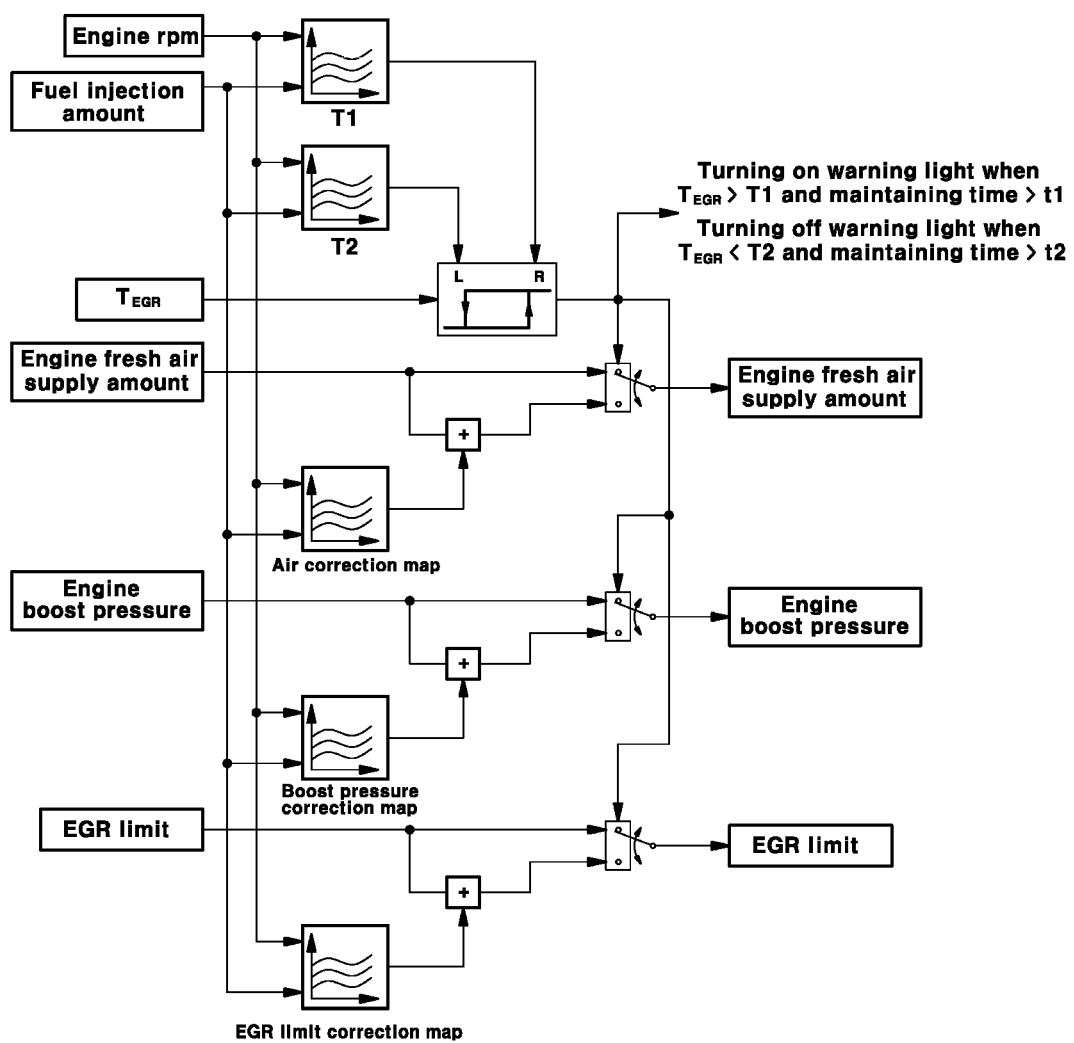
FIG. 2 is a view showing a control logic according to the embodiment of the present disclosure.

FIG. 1 is a block diagram showing a configuration of a system performing a control process according to an embodiment of the present disclosure. FIG. 2 is a view showing a control logic according to the embodiment of the present disclosure.

The present disclosure measures a temperature of recirculated exhaust gas (hereinbelow, referred to as "EGR gas") introduced to an intake manifold. When the EGR gas temperature rises excessively, the temperature of the EGR gas introduced to an engine intake system is controlled by changing an engine control value. Thus, damage to engine hardware, such as the intake manifold or parts of an exhaust gas recirculation system (hereinafter, referred to as "EGR system") is prevented.

To this end, in the present disclosure, a temperature sensor 11 is used to detect the EGR gas temperature. The temperature sensor 11 may be provided on a rear end of an EGR cooler and be an EGR cooler rear-end temperature sensor detecting gas temperature of the EGR cooler rear end.

The EGR cooler rear-end temperature sensor 11 is a temperature sensor detecting a temperature of the EGR gas supplied to an intake line after passing through the EGR cooler. The gas temperature detected by the EGR cooler rear-end temperature sensor 11 may be used for a controller 12 to determine whether efficiency of the EGR cooler of a diesel engine vehicle is lowered.

That is, the gas temperature detected by the EGR cooler rear-end temperature sensor 11 is used to determine whether efficiency of the EGR cooler is lowered and when to turn on an on-board diagnostics (OBD) warning light.

Since a decrease in the efficiency of the EGR cooler causes nitrogen oxide (NOx) to increase, the controller 12 checks whether the efficiency of the EGR cooler is lowered via the gas temperature of the EGR cooler rear end detected by the temperature sensor 11. When an efficiency decrease is determined, the controller turns on the OBD warning light to induce the repair of the associated parts.

Meanwhile, the controller 12 performs a control process according to the present disclosure and may be a normal controller or an engine controller, which controls the EGR system.

In the controller 12, a first reference temperature T1 is set to determine whether to enter into a protection mode. A second reference temperature T2 is also set to determine whether to release the protection mode.

In addition, in the controller 12, a first preset time t1 is set to determine whether to turn on a warning light 13 after entering into the protection mode. After releasing the protection mode, a second preset time t2 is set to determine whether to turn off the warning light 13.

In the controller 12, the gas temperature of the EGR cooler rear end ($T_{EGR}$) (hereinbelow, referred to as "EGR gas temperature") detected by the temperature sensor 11 is compared with the first reference temperature T1 and the second reference temperature T2. When the EGR gas temperature $T_{EGR}$ is higher than the first reference temperature T1 ($T_{EGR}>T1$), entering into the protection mode from a normal mode is performed. In the protection mode, when the EGR gas temperature $T_{EGR}$ is lower than the second reference temperature T2 ($T_{EGR}<T2$), the protection mode is released and changed to the normal mode.

Furthermore, in the embodiment of the present disclosure, the controller 12 turns on the warning light 13 when a state in which the EGR gas temperature ($T_{EGR}$) is higher than the first reference temperature T1 is maintained past the first preset time t1 (maintaining time>t1) in the state of the entering into the protection mode, i.e., when the state in which $T_{EGR}$ is higher than T1 is past the first preset time t1 from the time of entering into the protection mode.

In addition, the controller 12 turns off the warning light 13 when a state in which the EGR gas temperature $T_{EGR}$ is lower than the second reference temperature T2 is maintained past the second preset time t2 (maintaining time>t2) in the state in which the protection mode is released, i.e., when the state in which the $T_{EGR}$ is lower than the T2 is past the second preset time t2 from the time at which the protection mode is released.

Furthermore, after releasing the protection mode, the controller 12 allows an engine control and an EGR control of the normal mode to be performed. More particularly, as is described hereinafter, the controller 12 allows the engine control and the EGR control to be performed by using a control value of a normal control map, which is not corrected.

According to the present disclosure, the protection mode is a mode in which the temperature of the EGR gas supplied to the engine intake system (the intake line and the intake manifold) is lowered so as to protect engine-related parts, such as the intake manifold or an EGR valve 14, when the EGR gas temperature $T_{EGR}$ detected by the temperature sensor 11 is in an excessively high-temperature state higher than the first reference temperature T1.

In the present disclosure, when the EGR gas temperature $T_{EGR}$ is higher than the first reference temperature T1 ($T_{EGR}>T1$), it may be determined that the EGR cooler malfunctions or is damaged or an EGR bypass valve is stuck open. To warn of malfunction or damage, the present disclosure allows the warning light 13 to turn on when the state in which the $T_{EGR}$ is higher than the T1 is past the first preset time t1 after entering into the protection mode.

In this embodiment, the warning light 13 may be the OBD warning light.

In the present disclosure, the first reference temperature T1 may be set to be a temperature higher than the second reference temperature T2. The first preset time t1 may also be the same as or different from the second preset time t2.

In an embodiment of the present disclosure, the controller 12 may be set to determine the first reference temperature T1 and the second reference temperature T2 according to the engine operation condition. Accordingly, the controller 12 may use the first reference temperature T1 and the second reference temperature T2 according to the engine operation condition to determine whether to enter into or release the protection mode.

In other words, in the controller 12, the first reference temperature T1 and the second reference temperature T2 may be determined to be temperatures corresponding to a present engine operation condition. The first reference temperature T1 and the second reference temperature T2 may be changed according to the engine operation condition.

When the controller 12 allows the first reference temperature T1 and the second reference temperature T2 to be determined, the controller 12 may use a map in which engine operation condition information is input to determine the first reference temperature T1 and the second reference temperature T2.

In the controller 12, the map, which is capable of being used as reference temperature setting information according to the engine operation condition, may be divided into a map M1 determining the first reference temperature T1 and a map M2 determining the second reference temperature T2. In this case, the two maps M1 and M2 have the first reference temperature T1 and the second reference temperature T2 set, respectively, therein as values according to the engine operation condition.

The maps M1 and M2, which are used as the setting information for determining a reference temperature by being input and stored in advance in the controller 12, may be manufactured and tuned by using data obtained through a preceding test and an evaluation process.

In the embodiment of the present disclosure, the engine operation condition information used to determine the first reference temperature T1 and the second reference temperature T2 may include an engine rpm and a fuel injection amount.

Meanwhile, according to the present disclosure, in the entering into the protection mode, the controller 12 performs a control of lowering the EGR gas temperature $T_{EGR}$.

To this end, the controller 12 changes the engine control value to decrease the EGR gas temperature $T_{EGR}$. Here, the control value indicates a value of each of control factors allowing the EGR gas temperature $T_{EGR}$ to be controlled in an engine.

In addition, in the present disclosure, the control factors allowing the EGR gas temperature $T_{EGR}$ to be controlled may include a fresh air supply amount, which is an amount of fresh air supplied to the engine, and an EGR limit (a maximum value), which is a value used to control the inlet amount of an EGR gas.

Furthermore, as for the diesel engine vehicle having a turbo charger provided therein, the control factor may further include an engine boost pressure.

As the control factor determining the maximum value of the inlet amount of the EGR gas in the EGR system, the EGR limit may be a maximum opening degree value of the EGR valve. The controller 12 restricts a maximum opening degree amount of the EGR valve 14 according to the maximum opening degree value of the EGR valve, which is set.

In addition, the engine boost pressure is a pressure of the intake air of the fresh air and the EGR gas mixing with each other. The engine boost pressure may be controlled by the turbo charger.

In a normal vehicle, the control factors, such as the fresh air supply amount, the EGR limit, and the engine boost pressure, are obtained from the map according to the engine operation condition and are used to control the engine and the EGR system.

Apart from the existing map, in the embodiment of the present disclosure, the controller 12 includes correction maps M3, M4, and M5 used for determining correction values to correct each of the control factors (control values) according to the engine operation condition in the protection mode.

In the present disclosure, the existing map is different from each of the correction maps used to determine each of the correction values in the protection mode. The existing map is a base map used to determine each of the control values in the normal mode. Accordingly, the existing map is referred to as the normal control map in the description hereinbelow.

Each of the correction maps M3, M4, and M5 is provided in the controller 12 by each of the control factors. Each of the correction maps M3, M4, and M5 is a map in which the correction value, which is a value according to the engine operation condition, is set by each of the control factors.

The correction maps M3, M4, and M5 may be manufactured and tuned by using the data obtained through the preceding test and the evaluation process.

In each of the correction maps M3, M4, and M5, the engine operation condition may include the engine rpm and the fuel injection amount.

Furthermore, according to the embodiment of the present disclosure, the correction map may include the air correction map M3 and the EGR limit correction map M5. The correction map may further include the boost pressure correction map M4 as for the diesel engine vehicle having the turbo charger provided therein.

The correction value used to correct in a direction lowering the EGR gas temperature $T_{EGR}$ relative to the control value of the normal control map is set in each of the correction maps M3, M4, and M5.

In other words, as for the air correction map M3, the correction value is set to perform a correction of increasing the fresh air supply amount, which is the control value determined in the normal control map.

In addition, as for the boost pressure correction map M4, the correction value is set to perform a correction of increasing a boost pressure determined in the normal control map.

Furthermore, as for the EGR limit correction map M5, the correction value is set to perform a correction of decreasing the EGR limit determined in the normal control map.

For example, the EGR limit may be the maximum opening degree value of the EGR valve required to be preset to restrict an opening degree amount of the EGR valve 14 in controlling the EGR valve. When this is the EGR limit, the EGR limit correction map M5 is a map in which the correction value used to correct the maximum opening degree value of the EGR valve determined in the normal control map is set as a value according to the engine operation condition.

In this case, the correction value allowing a correction to be performed in a direction decreasing the maximum opening degree value of the EGR valve of the normal control map corresponding to the same engine operation condition is set in the EGR limit correction map M5.

Hereinbelow, the control process according to the embodiment of the present disclosure is described in steps referring to FIG. 3.

Figure 3:
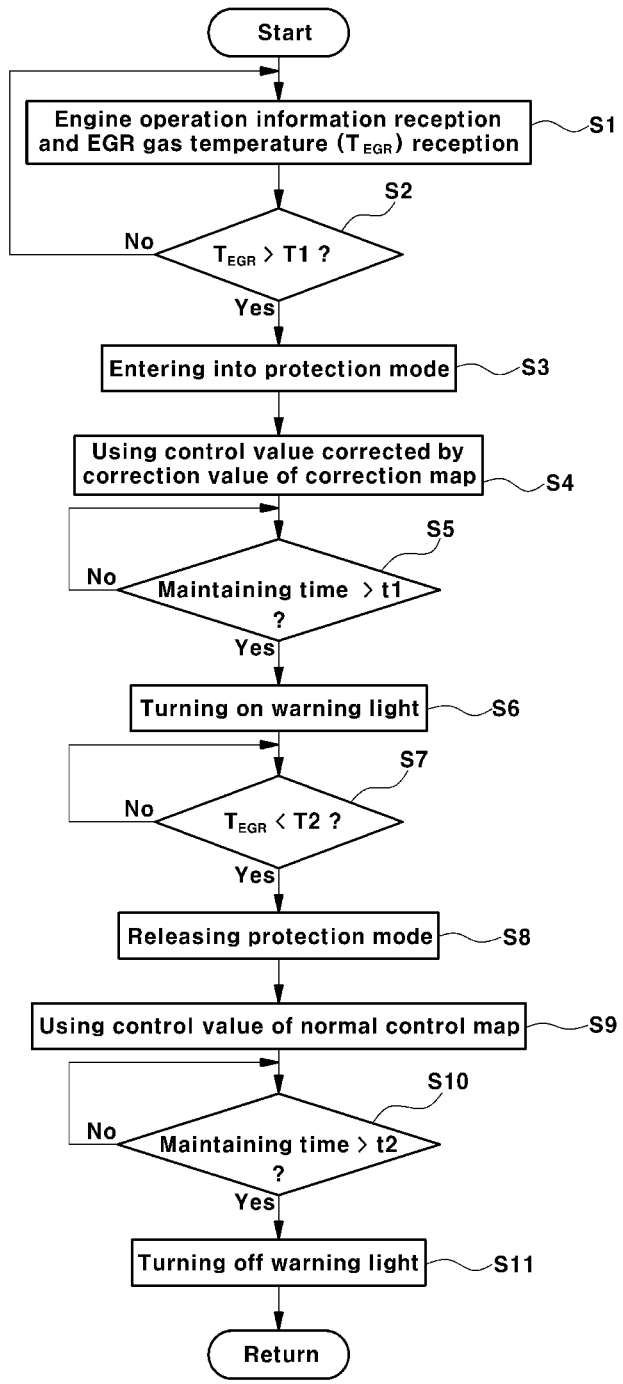
FIG. 3 is a flowchart showing the control process according to the embodiment of the present disclosure.

FIG. 3 is a flowchart showing the control process according to the embodiment of the present disclosure.

First, during engine operation, the controller 12 receives engine operation information and the EGR gas temperature $T_{EGR}$ detected by the temperature sensor 11 at S1.

In this embodiment, as mentioned above, the engine operation information may include the engine rpm and the fuel injection amount. The EGR gas temperature $T_{EGR}$ may be the gas temperature of the EGR cooler rear end.

Next, when the EGR gas temperature $T_{EGR}$ is higher than the first reference temperature T1 ($T_{EGR}$>T1) in comparing the EGR gas temperature $T_{EGR}$ with the first reference temperature T1 at S2, entering into the protection mode is performed at S3. After that, the control values of engine intake air, the EGR limit, and the engine boost pressure are corrected by using the correction values determined through the correction maps at S4.

Accordingly, in the protection mode, the control of the engine and the EGR valve 14 is performed using the corrected control values, i.e., the engine intake air, the EGR limit, and the engine boost pressure, which are corrected.

In addition, when the state in which the $T_{EGR}$ is higher than the T1 is past the first preset time t1 from the time of entering into the protection mode, i.e., when the state in which the EGR gas temperature $T_{EGR}$ is higher than the first reference temperature T1 is maintained past the first preset time t1 (maintaining time>t1), the warning light 13 turns on at S5 and S6.

At step S7, when the EGR gas temperature $T_{EGR}$ is lower than the second reference temperature T2 ($T_{EGR}$<T2) in comparing the EGR gas temperature $T_{EGR}$ with the second reference temperature T2, the protection mode is released at S8. After that, a normal control of the engine and the EGR valve 14 is performed at S9 using the control value of the normal control map, i.e., using the engine intake air, the EGR limit, and the engine boost pressure determined through the normal control map.

In addition, when the state in which the $T_{EGR}$ is lower than the T2 is past the second preset time t2 from the time released from the protection mode, i.e., when the state in which the EGR gas temperature $T_{EGR}$ is lower than the second reference temperature T2 is maintained past the second preset time t2 (maintaining time>t2), the warning light 13 turns off at S10 and S11.

Accordingly, according to the control method of the present disclosure, the EGR gas temperature $T_{EGR}$ can be efficiently controlled and problems due to excessive rise of the EGR gas temperature $T_{EGR}$ can be efficiently prevented.

Although an embodiment of the present disclosure has been described for illustrative purposes, the claims of the present disclosure are not limited to only the embodiment set forth herein. Those of ordinary skill in the art will appreciate that various modifications, additions, and substitutions are possible without departing from the scope and spirit of the disclosure as disclosed in the accompanying claims.

What is claimed is:

1. A control method of a vehicle having an exhaust gas recirculation (EGR) system, the control method comprising:
    detecting, by a temperature sensor, a temperature of recirculated exhaust gas introduced to an engine intake system by the EGR system, wherein the temperature sensor is provided on a rear end of an EGR cooler and is an EGR cooler rear-end temperature sensor configured to detect gas temperature at the rear end of the EGR cooler;
    performing, by a controller, a protection mode to reduce the temperature of the recirculated exhaust gas when determining that the temperature of the recirculated exhaust gas is higher than a first reference temperature by comparing the temperature of the recirculated exhaust gas detected by the temperature sensor with the first reference temperature;
    determining, by the controller, a correction value such that the controller reduces the temperature of the recirculated exhaust gas by using engine operation information received in the performing of the protection mode; and
    correcting, by the controller, an engine control value by using the determined correction value and controlling an engine according to the corrected engine control value,
    wherein the engine control value is an EGR limit used to restrict a fresh air supply amount of the engine and an inlet amount of the recirculated exhaust gas introduced to the engine intake system, and
    wherein the EGR limit is a maximum opening degree value of an EGR valve controlling the inlet amount of the recirculated exhaust gas.

2. The control method of claim 1, wherein in the determining of the correction value, the engine operation information includes an engine rpm and a fuel injection amount.

3. The control method of claim 1, wherein the correction value is determined to be a value according to the engine operation information of a map.

4. The control method of claim 1, wherein the engine control value further includes an engine boost pressure.

5. The control method of claim 1, wherein the EGR cooler is configured to cool the recirculated exhaust gas and the temperature sensor is configured to detect the temperature of the recirculated exhaust gas passing through the EGR cooler.

6. The control method of claim 1, wherein the first reference temperature is determined to be a value according to the engine operation information of a map.

7. The control method of claim 6, wherein the engine operation information used to determine the first reference temperature includes an engine rpm and a fuel injection amount.

8. The control method of claim 1, further comprising:
    turning on a warning light by the controller when a state, in which the detected temperature of the recirculated exhaust gas is higher than the first reference temperature, is maintained past a first preset time after initiation of the performing the protection mode.

9. The control method of claim 1, further comprising:
    releasing, by the controller, the protection mode when determining that the temperature of the recirculated exhaust gas is lower than a second reference temperature by comparing the temperature of the recirculated exhaust gas detected by the temperature sensor with the second reference temperature in the performing of the protection mode.

10. The control method of claim 9, wherein the second reference temperature is determined to be a value according to the engine operation information of a map.

11. The control method of claim 10, wherein the engine operation information used to determine the second reference temperature includes an engine rpm and a fuel injection amount.

12. The control method of claim 9, further comprising:
    turning on a warning light by the controller when a state in which the temperature of the recirculated exhaust gas detected after initiation of the performing the protection mode is higher than the first reference temperature is maintained past a first preset time, and
    turning off the warning light by the controller when a state in which the temperature of the recirculated exhaust gas detected after releasing the protection mode is lower than the second reference temperature is maintained past a second preset time.

13. A control method of a vehicle having an exhaust gas recirculation (EGR) system, the control method comprising:

detecting, by a temperature sensor, temperature of recirculated exhaust gas introduced to an engine intake system by the EGR system, wherein the temperature sensor is provided on a rear end of an EGR cooler and is an EGR cooler rear-end temperature sensor configured to detect gas temperature at the rear end of the EGR cooler;

performing, by a controller, a protection mode to reduce the temperature of the recirculated exhaust gas when determining that the temperature of the recirculated exhaust gas is higher than a first reference temperature by comparing the temperature of the recirculated exhaust gas detected by the temperature sensor with the first reference temperature;

determining, by the controller, a correction value such that the controller reduces the temperature of the recirculated exhaust gas by using engine operation information received in the performing of the protection mode; and correcting, by the controller, an engine control value by using the determined correction value and controlling an engine according to the corrected engine control value, wherein the engine control value is an EGR limit used to restrict a fresh air supply amount of the engine and an inlet amount of the recirculated exhaust gas introduced to the engine intake system, wherein the engine control value further includes an engine boost pressure, wherein the EGR limit is a maximum opening degree value of an EGR valve controlling the inlet amount of the recirculated exhaust gas, wherein the controller includes an air correction map and an EGR limit correction map used for determining correction values to correct each of control values according to an engine operation condition in the protection mode, wherein as for the air correction map, the correction values are set to perform a correction of increasing the fresh air supply amount, which is the control value determined in a normal control map, wherein as for the EGR limit correction map, the correction values are set to perform a correction of decreasing the EGR limit determined in the normal control map.

* * * * *